(12) United States Patent
Woo et al.

(10) Patent No.: US 12,411,641 B2
(45) Date of Patent: Sep. 9, 2025

(54) ELECTRONIC DEVICE COMPRISING DISPLAY WITH VARIABLE DISPLAY AREA AND CONTROL METHOD

(71) Applicant: Samsung Electronics Co., Ltd., Suwon-si (KR)

(72) Inventors: Kwangtaek Woo, Suwon-si (KR); Byoungkug Kim, Suwon-si (KR); Changho Lee, Suwon-si (KR); Deukkyu Oh, Suwon-si (KR); Jinwan An, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 312 days.

(21) Appl. No.: 18/166,206

(22) Filed: Feb. 8, 2023

(65) Prior Publication Data

US 2023/0195400 A1   Jun. 22, 2023

Related U.S. Application Data

(63) Continuation of application No. PCT/KR2021/010688, filed on Aug. 11, 2021.

(30) Foreign Application Priority Data

Aug. 11, 2020  (KR) .................. 10-2020-0100435

(51) Int. Cl.
*G06F 3/14* (2006.01)
*G06F 1/16* (2006.01)
*G06F 3/0486* (2013.01)

(52) U.S. Cl.
CPC ............ *G06F 3/14* (2013.01); *G06F 1/1624* (2013.01); *G06F 1/1652* (2013.01); *G06F 3/0486* (2013.01)

(58) Field of Classification Search
CPC combination set(s) only.
See application file for complete search history.

(56) References Cited

U.S. PATENT DOCUMENTS

| | | | |
|---|---|---|---|
| 8,275,420 B2 * | 9/2012 | Lim | G06F 1/1652 455/566 |
| 9,262,059 B2 | 2/2016 | Kim et al. | |

(Continued)

FOREIGN PATENT DOCUMENTS

| | | |
|---|---|---|
| KR | 10-2006-0077449 A | 7/2006 |
| KR | 10-2008-0018162 A | 2/2008 |

(Continued)

OTHER PUBLICATIONS

International Search Report dated Nov. 15, 2021, issued in International Patent Application No. PCT/KR2021/010688.

(Continued)

*Primary Examiner* — Lisa Lea-Edmonds
(74) *Attorney, Agent, or Firm* — Jefferson IP Law, LLP

(57) ABSTRACT

An electronic device is provided. The electronic device includes a first housing, a second housing slidable with respect to the first housing, a display having one end fixed to the second housing and having a variable information display area in which information is visually displayed according to sliding of the second housing, a sliding motor, and a processor operatively connected to the display and the sliding motor and, when an application is executed, the processor acquires first information including a display ratio of application-related information that is be displayed on the display by executing the application, acquires second information including a screen ratio according to the information display area of the display, compares the first information with the second information, and controls the sliding motor on the basis of the comparison result.

14 Claims, 14 Drawing Sheets

(56) References Cited

U.S. PATENT DOCUMENTS

| | | |
|---|---|---|
| 9,860,474 B2 | 1/2018 | Park et al. |
| 10,490,169 B2 | 11/2019 | Oh et al. |
| 11,749,151 B2 * | 9/2023 | Woo ..................... G06F 3/04847 345/661 |
| 12,101,550 B2 * | 9/2024 | Shin ..................... H04N 5/2624 |
| 12,167,124 B2 * | 12/2024 | Jang ..................... H04N 23/632 |
| 2006/0146190 A1 | 7/2006 | Ahn et al. |
| 2009/0051830 A1 | 2/2009 | Matsushita et al. |
| 2010/0167791 A1 * | 7/2010 | Lim ..................... G06F 1/1624 455/566 |
| 2014/0204037 A1 * | 7/2014 | Kim ..................... G06F 3/03 345/173 |
| 2016/0306534 A1 | 10/2016 | Woo et al. |
| 2018/0364827 A1 | 12/2018 | Chung |
| 2018/0374452 A1 | 12/2018 | Choi et al. |
| 2019/0261519 A1 * | 8/2019 | Park ..................... G06F 1/1677 |
| 2023/0195400 A1 * | 6/2023 | Woo ..................... G06F 1/1652 345/667 |

FOREIGN PATENT DOCUMENTS

| | | |
|---|---|---|
| KR | 10-2009-0075254 A | 7/2009 |
| KR | 10-2010-0079100 A | 7/2010 |
| KR | 10-1107127 B1 | 1/2012 |
| KR | 10-1431806 B1 | 8/2014 |
| KR | 10-2016-0123620 A | 10/2016 |
| KR | 10-2017-0043347 A | 4/2017 |
| KR | 10-2017-0058220 A | 5/2017 |
| KR | 10-2017-0083404 A | 7/2017 |
| KR | 10-2019-0101184 A | 8/2019 |
| KR | 10-2020-0075809 A | 6/2020 |

OTHER PUBLICATIONS

Korean Office Action dated Sep. 10, 2024, issued in Korean Patent Application No. 10-2020-0100435.

* cited by examiner

ELECTRONIC DEVICE COMPRISING DISPLAY WITH VARIABLE DISPLAY AREA AND CONTROL METHOD

CROSS-REFERENCE TO RELATED APPLICATION(S)

This application is a continuation application, claiming priority under § 365 (c), of an International application No. PCT/KR2021/010688, filed on Aug. 11, 2021, which is based on and claims the benefit of a Korean patent application number 10-2020-0100435, filed on Aug. 11, 2020, in the Korean Intellectual Property Office, the disclosure of each of which is incorporated by reference herein in its entirety.

BACKGROUND

1. Field

The disclosure relates to an electronic device including a display having a variable display area and a method of controlling the electronic device.

2. Description of Related Art

A display may serve, for example, the most important function in a portable electronic device. The display may visually display information. Factors such as the design, size, and quality of the display may play a significant role in consumers' electronic device selection.

As displays having various aspect ratios appear, contents provided through electronic devices are being produced to be output in various ratios.

Recently, with the development of display technology, flexible displays are being launched into the market. When such a flexible display is used, a display in which a displayed screen size is variable may also be implemented. For example, an electronic device including a sliding display in which a screen size increases or decreases through sliding is also being devised.

The above information is presented as background information only to assist with an understanding of the disclosure. No determination has been made, and no assertion is made, as to whether any of the above might be applicable as prior art with regard to the disclosure.

SUMMARY

Various applications and contents are constantly being supplied to the market. These applications and contents may visually display information through a display. Visual information may have various display ratios. For example, information may be displayed in a display ratio such as 3:2 or 16:9.

In the case of displaying information having a display ratio different from an original aspect ratio through a conventional display having a fixed aspect ratio, a letter box may occur on the display, thus, a display area may be used inefficiently. In some cases, information may be partially cut off and displayed.

Aspects of the disclosure are to address at least the above-mentioned problems and/or disadvantages and to provide at least the advantages described below. Accordingly, an aspect of the disclosure is to provide an electronic device capable of effectively displaying information having different display ratios through a display having a variable display area and a method of controlling the same.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing slidably installed with respect to the first housing, a display having one end fixed to the second housing and having a variable information display area, which is an area in which information may be visually displayed according to sliding of the second housing, a sliding motor driven to slide the second housing with respect to the first housing, and a processor operatively connected with the display and the sliding motor, wherein the processor may be configured to acquire first information including a display ratio of application related information to be displayed on the display by execution of the application when the application is executed, to acquire second information including an aspect ratio according to an information display area of the display, to compare the first information and the second information, and to control the sliding motor based on the comparison result.

In accordance with another aspect of the disclosure, an electronic device is provided. The electronic device includes a first housing, a second housing slidably installed with respect to the first housing, a display having one end fixed to the second housing and having a variable information display area according to sliding of the second housing, a sliding motor driven to slide the second housing with respect to the first housing, and a processor operatively connected with the display and the sliding motor, wherein the processor may be configured to identify whether an area of a letter box displayed in a portion adjacent to an edge of the display satisfies a preconfigured criterion, and to control the sliding motor based on the identification result.

In accordance with another aspect of the disclosure, an electronic device is provided. The electronic device includes a first housing, a second housing slidably installed with respect to the first housing, a display having one end fixed to the second housing and having a variable information display area according to sliding of the second housing, and a processor operatively connected with the display, wherein the processor may be configured to acquire first information including a display ratio of application related information to be displayed on the display by execution of the application when the application is executed, to acquire second information including an aspect ratio according to an information display area of the display, which is an area in which information may be visually displayed, to compare the first information and the second information, and to display a visual interface that induces a user to slide the display on the display based on the comparison result.

In accordance with another aspect of the disclosure, a method of controlling a display of an electronic device is provided. The method includes acquiring, by a processor, first information including a display ratio of application related information to be displayed on the display by execution of the application, when the application is executed, acquiring, by the processor, second information including an aspect ratio according to an information display area of the display, which is an area in which information may be visually displayed, comparing, by the processor, the first information and the second information, and controlling, by the processor, a sliding motor to change an information display area of the display based on the comparison result.

In accordance with another aspect of the disclosure, a method of controlling a display of an electronic device is provided. The method includes acquiring, by a processor, an area of a letter box displayed on a portion adjacent to an edge of the display, identifying, by the processor, whether the area of the letter box satisfies a preconfigured criterion, and controlling, by the processor, a sliding motor to change an information display area of the display, which is an area in which information may be visually displayed based on the identification result.

In accordance with another aspect of the disclosure, a method of controlling a display of an electronic device is provided. The method includes acquiring, by a processor, first information including a display ratio of application related information to be displayed on the display by execution of the application, when the application is executed, acquiring, by the processor, second information including an aspect ratio according to an information display area of the display, which is an area in which information may be visually displayed, comparing, by the processor, the first information and the second information, and displaying, by the processor, a visual interface that induces a user to slide the display on the display based on the comparison result.

According to various embodiments disclosed in this document, by automatically changing a display area of a display included in an electronic device, information having different display ratios can be displayed in an optimal aspect ratio. Thereby, it is possible to minimize a size of a letter box displayed on the display and provide visual information to a user in an optimal ratio.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
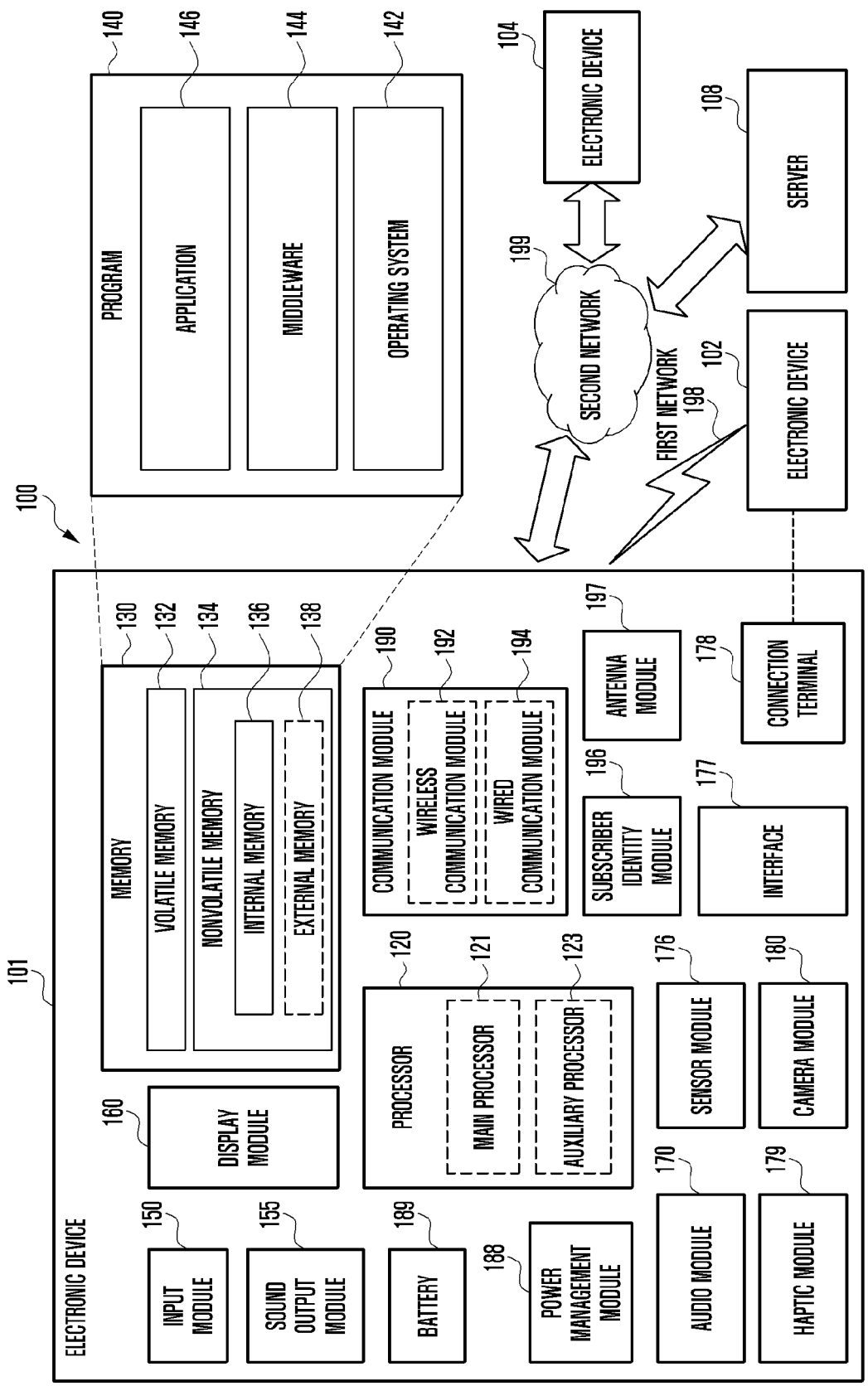
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In connection with the description of the drawings, like reference numerals may be used for similar or related components.

In this document, each of phrases such as "A or B," "at least one of A and B," "at least one of A or B," "A, B, or C," "at least one of A, B and C," and "at least one of A, B, or C" may include any one of or all possible combinations of items listed together in the corresponding one of the phrases. Terms such as "first" or "second" may be simply used for distinguishing a corresponding component from other corresponding components, and do not limit the corresponding components in other aspects (e.g., importance or order). In the case that one (e.g., first) component is referred to as "coupled" or "connected" to another (e.g., second) component with or without the terms "functionally" or "communicatively," it denotes that the one component may be connected to the other component directly (e.g., by wire), wirelessly, or through a third component.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140), including one or more instructions that are stored in a storage medium (e.g., internal memory 136 or external memory 138) that is readable by a machine (e.g., electronic device 101), and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mm Wave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
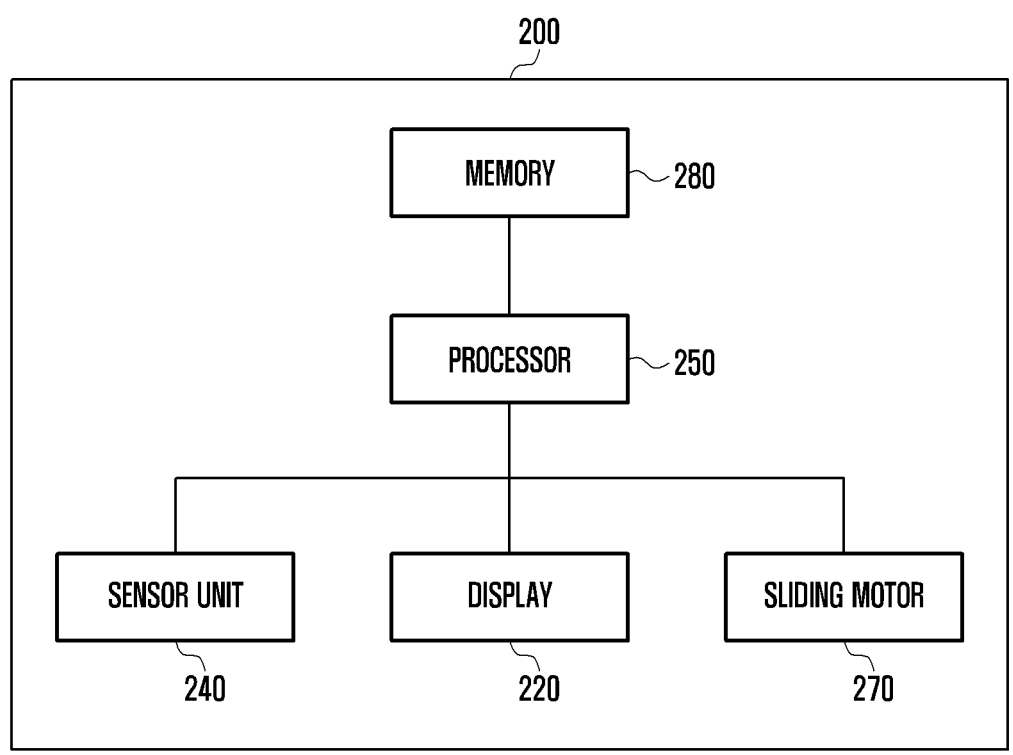
FIG. 2A is a block diagram illustrating an electronic device according to an embodiment of the disclosure.

FIG. 2A is a block diagram illustrating an electronic device according to an embodiment of the disclosure.

Referring to FIG. 2A, an electronic device 200 (e.g., the electronic device 101 of FIG. 1) may include a processor 250, a memory 280, a display 220, a sliding motor 270, and/or a sensor unit 240. The components included in FIG. 2A are for some of the components included in the electronic device 200, and the electronic device 200 may include various other components as illustrated in FIG. 1.

According to various embodiments, the processor 250 may be the processor 120 described in FIG. 1, the memory 280 may be the memory 130 described in FIG. 1, and the display 220 may be the display module 160 described in FIG. 1. The processor 250 may be connected to the display 220 to process information so that various types of information may be visually displayed through the display 220. The processor 250 may be connected to the sensor unit 240 and the sliding motor 270 to receive various types of information measured by the sensor unit 240 from the sensor unit 240 and to control the sliding motor 270.

According to various embodiments, the sensor unit 240 may be the sensor module 176 described in FIG. 1. The sensor unit 240 may include at least one sensor. For example, the sensor unit 240 may include a distance sensor. According to various embodiments, the electronic device 200 may include a first housing (e.g., a first housing 211 of FIG. 2B) and a second housing (e.g., a second housing 213 of FIG. 2B) slidably installed with respect to the first housing. The distance sensor that may be included in the sensor unit 240 may be a sensor that measures the degree of expansion of the housing as the second housing slides with respect to the first housing. In an embodiment, the distance sensor included in the sensor unit 240 may include at least one of an optical distance sensor, an ultrasonic distance sensor, or a radio wave type distance sensor. Further, various sensors capable of measuring a distance or displacement may be included in the distance sensor.

According to various embodiments, the distance sensor may measure the degree of expansion of the housing in various methods. In an embodiment, the distance sensor may measure a distance in a time of flight (TOF) method. Such a distance sensor may measure a distance using a time required for light or radio waves emitted from the distance sensor to be reflected by another object and returned. In an embodiment, the distance sensor may measure a distance using a light quantity measurement method. Such a distance sensor may compare amounts of light introduced into the distance sensor to measure a distance. The distance sensor may determine that a distance is longer as an amount of incoming light is smaller, and a distance is shorter as an amount of light is greater. In an embodiment, the distance sensor may measure a distance by analyzing a pattern. Such a distance sensor may measure a distance between two points marked on a particular object. The distance sensor may determine that the smaller the distance between the two points is, the longer the distance between the distance sensor and the specific object is, and the larger the distance between the two points is, the shorter the distance between the distance sensor and the specific object is. Further, the distance sensor may measure a distance in various methods.

According to various embodiments, the sensor unit 240 may include an expansion detection sensor. The expansion detection sensor may measure a state according to a distance between the second housing and the first housing. In an embodiment, the expansion detection sensor may generate an electrical signal according to the degree of expansion of the housing. For example, the extension detection sensor may be a hall sensor that detects a change in the magnetic field due to the expansion of the housing, a sensor that detects an interaction of a magnet, a sensor that detects the depression of a physical switch, or a sensor that detects contact between terminals. The expansion detection sensor may detect a state in which the housing is fully expanded, a state in which the housing is contracted to the maximum, or an intermediate state.

Figure 2B:
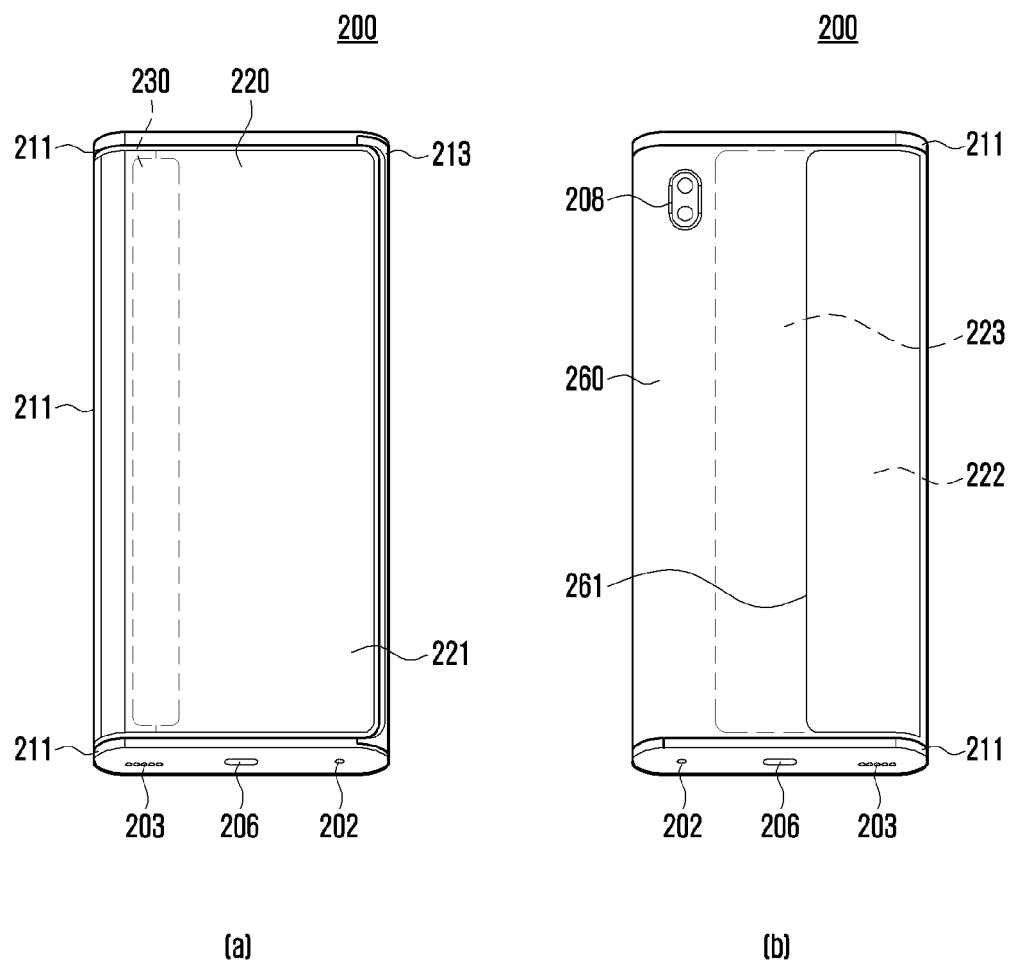
FIG. 2B is a front and rear perspective view illustrating an electronic device according to an embodiment of the disclosure.
Figure 2C:
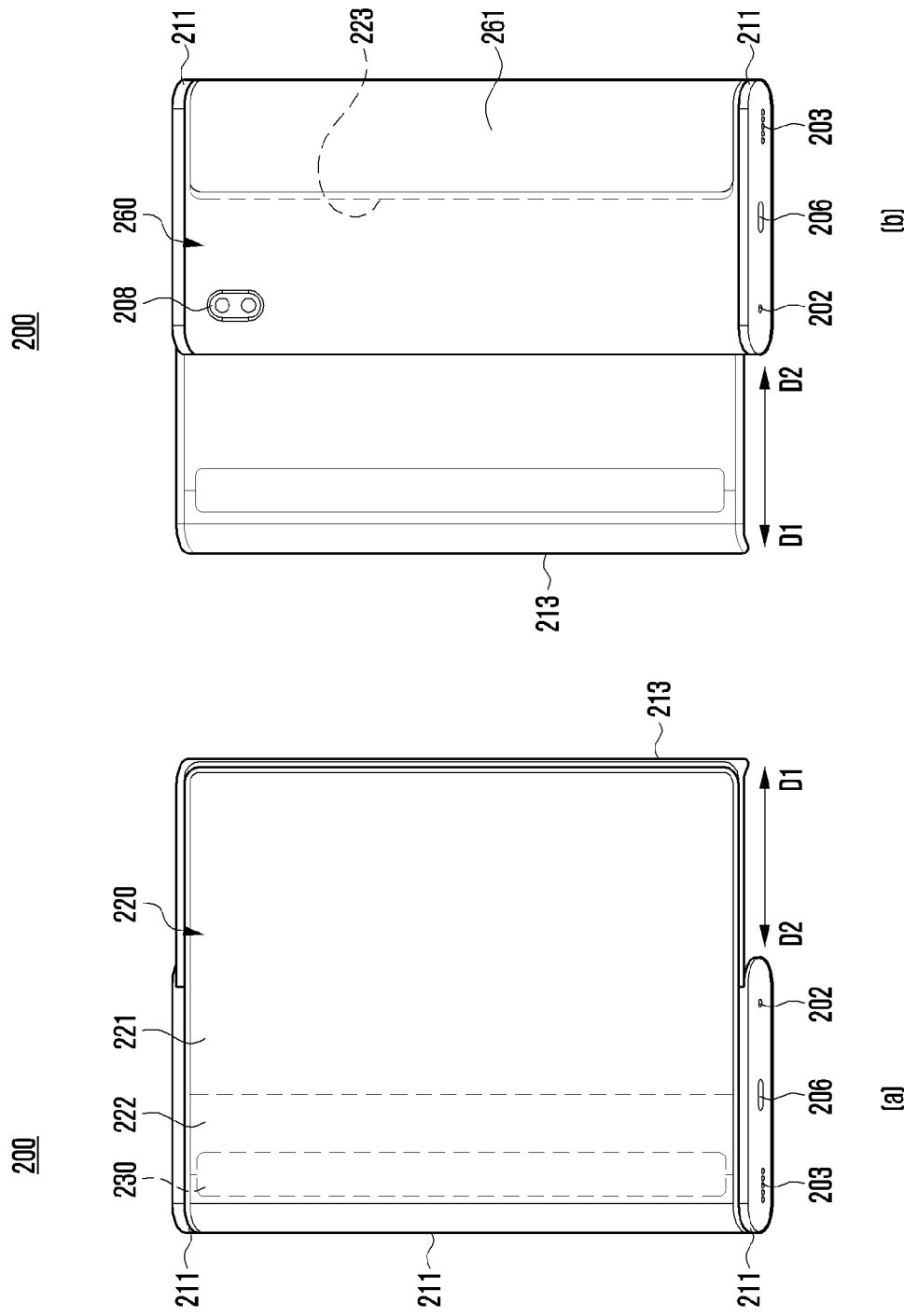
FIG. 2C is a front and rear perspective view according to extension of a housing of the electronic device illustrated in FIG. 2B according to an embodiment of the disclosure.

FIG. 2B is a front and rear perspective view illustrating an electronic device according to an embodiment of the disclosure. FIG. 2C is a front and rear perspective view according to extension of a housing of the electronic device illustrated in FIG. 2B according to an embodiment of the disclosure.

The electronic device 200 (e.g., the electronic device 101 of FIG. 1) according to various embodiments disclosed in this document may include the display 220 (e.g., the display module 160 of FIG. 1) having a variable information display area. Here, the information display area may denote an area of a region in which visual information may be displayed. According to various embodiments, when the information display area of the display 220 increases, the electronic device may display more information on the display 220. A housing structure of the electronic device 200 described below is only one example of an electronic device in which the information display area may be changed, and the information display area of the display 220 may be changed in various methods.

According to various embodiments, the electronic device 200 may include slidable housings (e.g., the first housing 211 and the second housing 213). With reference to FIG. 2A, the electronic device 200 may include the first housing 211, the second housing 213, and the display 220.

According to various embodiments, the display 220 may be a flexible display. The information display area of the display 220 may be expanded or reduced according to sliding of the second housing 213 with respect to the first housing 211. For example, based on FIG. 2B, when the second housing 213 slides with respect to the first housing 211 in a first direction (e.g., a direction D1 of FIG. 2C), the information display area of the display 220 may be expanded, and when the second housing 213 slides in the second direction (e.g., a direction D2 of FIG. 2C) with respect to the first housing 211, the information display area of the display 220 may be reduced. At least a partial area (e.g., a first area 221 of FIG. 2B) of the display 220 may be visually visible from the outside at the front surface of the electronic device 200, and the remaining area (e.g., a second area 222 and/or a third area 223 of FIG. 2B) of the display 220 may be received inside the electronic device 200. Here, the front surface may denote a surface facing a +Z direction based on FIG. 2B. For example, based on FIG. 2B, the first area 221 of the display 220 may be visually visible from the outside at the front surface of the electronic device 200, and the second area 222 and the third area 223 may be received inside the electronic device 200. As the second housing 213 slides with respect to the first housing 211, the second area 222 and the third area 223 may be visually visible from the outside at the front surface of the electronic device 200.

Referring to part (b) of FIGS. 2B and 2C, according to various embodiments, a rear cover 260 of the electronic device 200 may cover a rear surface of the electronic device 200. The rear surface of the electronic device 200 may be a surface facing the front surface of the electronic device. Here, the rear surface may denote a surface facing a −Z direction based on FIG. 2B. In an embodiment, the rear cover 260 may include a transparent area 261. The transparent area 261 may be one area of the rear cover 260 made of a transparent material. In this case, a partial area (e.g., the second area 222 and/or the third area 223) of the display 220 received inside the electronic device 200 may be visually visible from the outside of the electronic device 200 through the transparent area 261.

According to various embodiments, the first housing 211 may receive the display 220. For example, a recess for receiving a portion of the display 220 may be formed at the front surface of the first housing 211. Here, the front surface may denote a surface facing the +Z direction based on FIG. 2B. According to an embodiment, at least a portion of the first housing 211 may be made of a metal material or a non-metal material having rigidity of the magnitude configured to support the display 220.

According to various embodiments, the second housing 213 may be slidably coupled to the first housing 211. The second housing 213 may, for example, slide in a first direction (e.g., a direction D1 of FIG. 2C) or a second direction (e.g., a direction D2 of FIG. 2C), as illustrated in FIG. 2C. At least a partial area of the second housing 213 may be fixed to the display 220. At least a portion of the second housing 213 may be made of a metal material or a non-metal material having rigidity of the magnitude configured to support the display 220.

According to various embodiments, as illustrated in FIG. 2B, when the display 220 slides, a ratio of the information display area may be varied. For example, as the display 220 slides, a ratio of the information display area may be varied, such as 1:1, 3:2, or 16:9. Because a sliding operation of the display 220 may occur continuously, the ratio of the information display area may be variously changed in addition to this.

According to various embodiments, the electronic device 200 may include a sliding motor (not illustrated) inside the housing. According to various embodiments, the processor (e.g., the processor 120 of FIG. 1 or the processor 250 of FIG. 2A) may control the display 220 and the sliding motor (e.g., the sliding motor 270 of FIG. 2A). According to various embodiments, the sliding motor may be driven to slide the second housing 213 with respect to the first housing 211.

According to an embodiment, the processor of the electronic device 200 may transfer a control signal to the sliding motor.

According to an embodiment, the sliding motor may be driven according to at least one of a plurality of control signals transferred from the processor. For example, in the case that various events (e.g., application execution) occur in the electronic device 200, the sliding motor may receive a control signal from the processor.

According to an embodiment, the sliding motor may be installed in any one of the first housing 211 and the second housing 213 to slide the second housing 213 with respect to the first housing 211 according to at least one of a plurality of control signals transferred from the processor. According to an embodiment, the sliding motor may be replaced with various components that slide the second housing 213 with respect to the first housing 211. According to an embodiment, the sliding motor may use various types of actuators. For example, the sliding motor may use an actuator capable of moving a cylinder performing a linear motion.

Referring to part (a) of FIGS. 2B and 2C, according to various embodiments, a sliding shaft 230 may be disposed inside the electronic device 200. The sliding shaft 230 may guide expansion or contraction of the display 220 by sliding the second housing 213 with respect to the first housing 211. Areas (e.g., the second area 222 and the third area 223) of the display received inside the electronic device 200 may be moved to the front of the electronic device 200 through the sliding shaft 230 to be visible from the front surface of the electronic device 200. In an embodiment, the sliding shaft 230 may rotate by the operation of a sliding motor. By the rotation of the sliding shaft 230, the second housing 213 may be slid with respect to the first housing 211. In another embodiment, the sliding shaft 230 may simply guide a movement of the display 220 according to sliding of the second housing 213. The sliding shaft 230 may guide the display 220 so that the display 220 does not deviate from the sliding motion.

According to various embodiments, the electronic device 200 may further include a front camera module (not illustrated) exposed to the front thereof and a rear camera module 208 exposed to the rear thereof.

According to various embodiments, the electronic device 200 may further include a connector hole 206. The connector hole 206 may include a first connector hole 206 capable of receiving a connector (e.g., USB connector) for transmitting and receiving power and/or data to and from an external electronic device, and/or a second connector hole (not illustrated) (e.g., earphone jack) capable of receiving a connector for transmitting and receiving audio signals to and from an external electronic device.

According to various embodiments, the electronic device 200 may further include an audio module (e.g., microphone hole 202 and/or speaker hole 203). The audio module may include a microphone hole 202 and/or a speaker hole 203. A microphone for acquiring an external sound may be disposed inside the microphone hole 202. The speaker hole 203 may include an external speaker hole 203 and/or a receiver hole (not illustrated) for communication. In another embodiment, the speaker hole 203 and the microphone hole 202 may be implemented into one hole, or a speaker may be included without the speaker hole 203 (e.g., piezo speaker).

Hereinafter, a display ratio may denote a horizontal and vertical ratio of visual information related to an application or content. An aspect ratio may denote horizontal and vertical ratios of the information display area of the display 220 described above.

In the electronic device 200 according to various embodiments disclosed in this document, an information display area of the display 220 may be varied according to information to be displayed on the display 220. As described above, the change of the information display area may be made through a sliding motion of the display 220.

Figure 3A:
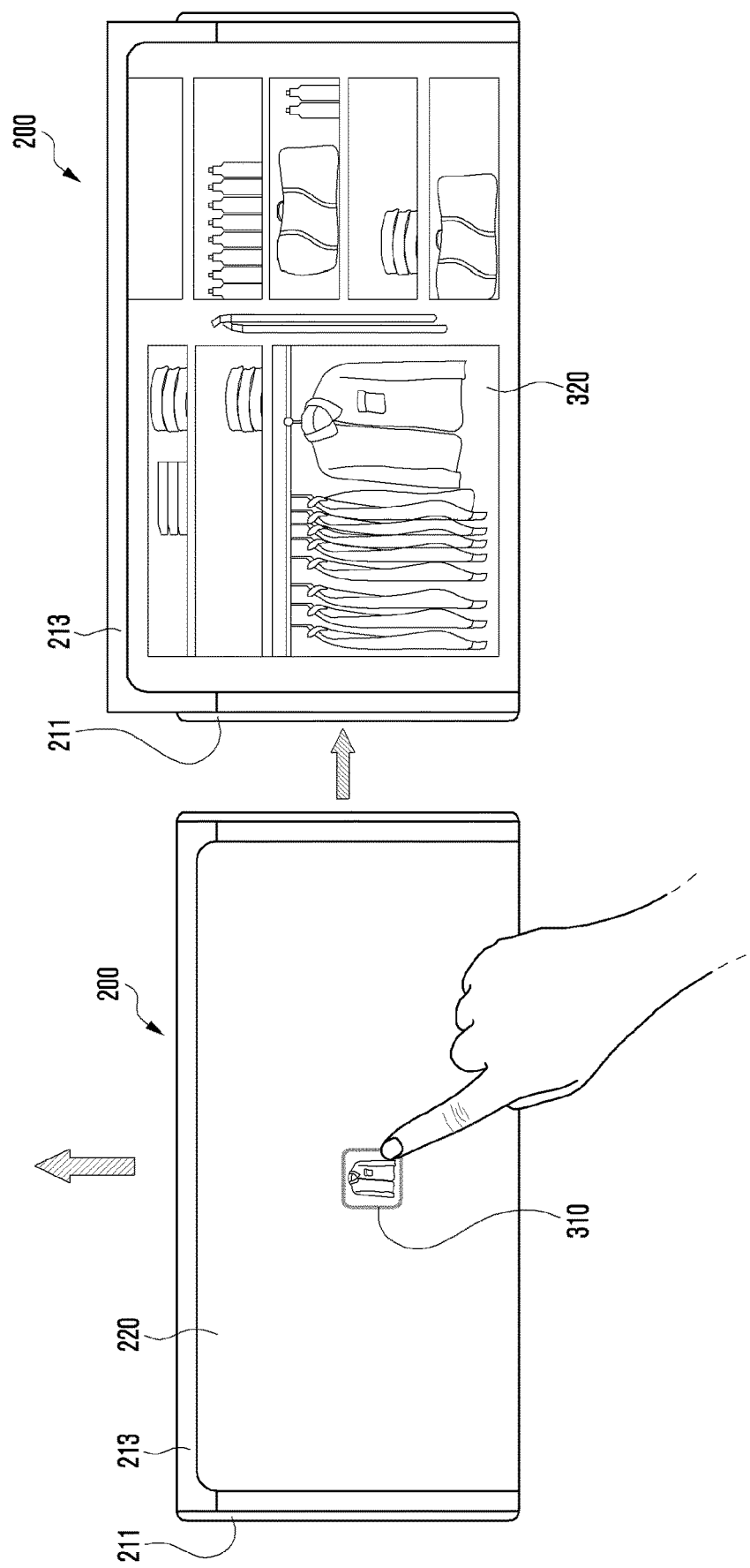
FIG. 3A is a diagram illustrating an operation example of a display included in an electronic device according to an embodiment of the disclosure.
Figure 3B:
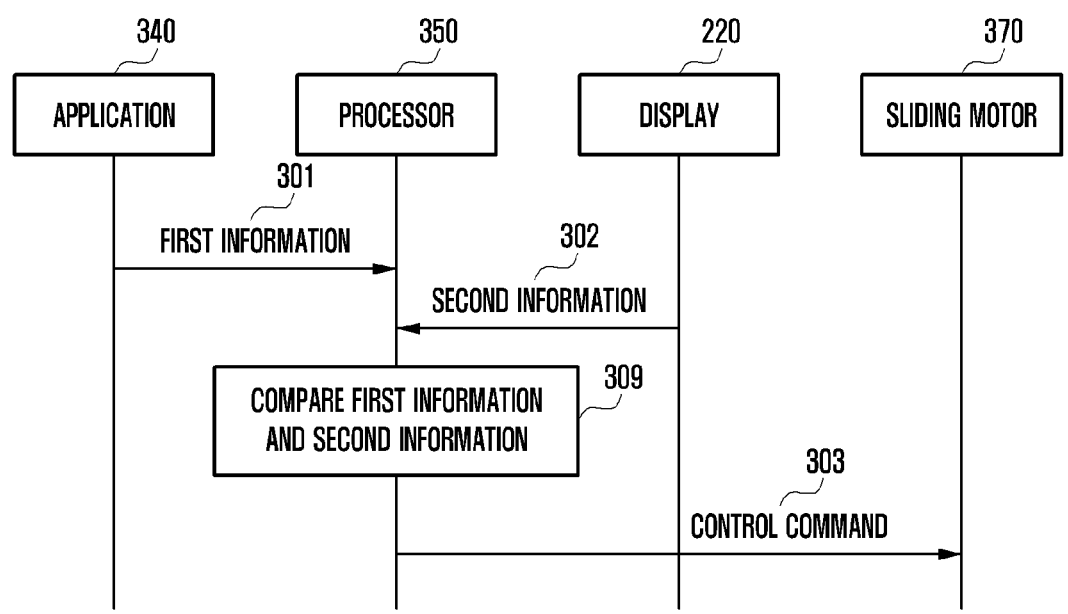
FIG. 3B is a message flow diagram controlling a sliding motor included in an electronic device according to an embodiment of the disclosure.
Figure 3C:
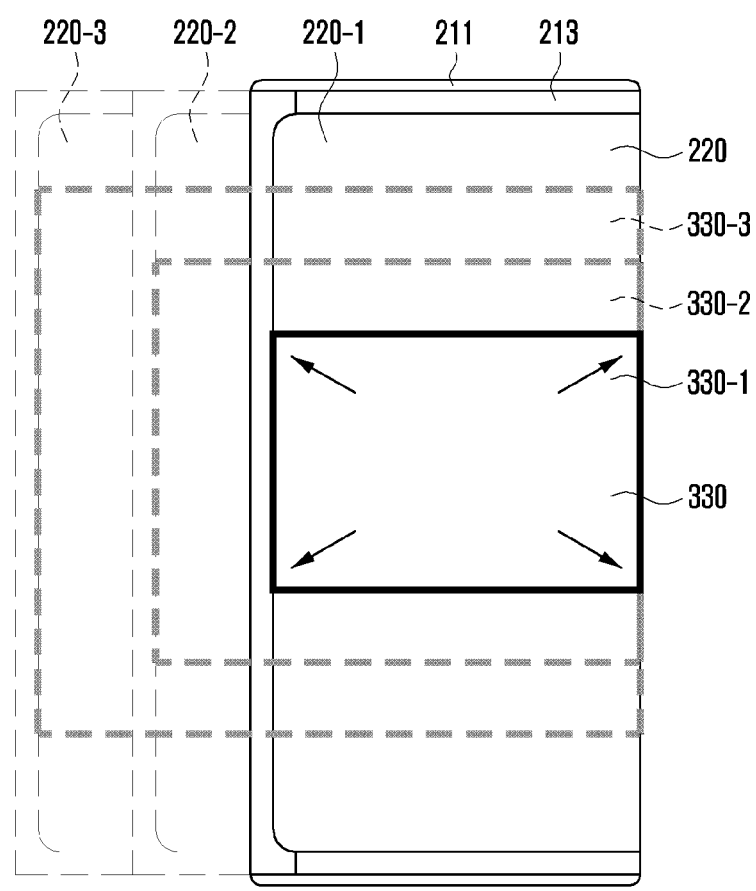
FIG. 3C is a diagram illustrating a method of controlling a display included in an electronic device according to an embodiment of the disclosure.

FIG. 3A is a diagram illustrating an operation example of a display included in an electronic device according to an embodiment of the disclosure. FIG. 3B is a message flow diagram controlling a sliding motor included in an electronic device according to an embodiment of the disclosure. FIG. 3C is a diagram illustrating a method of controlling a display included in an electronic device according to an embodiment of the disclosure.

According to various embodiments, when various applications (e.g., application 340) or functions installed in the electronic device 200 (e.g., the electronic device 101 of FIG. 1) are executed, a processor 350 (e.g., the processor 120 of FIG. 1 or the processor 250 of FIG. 2A) may control a sliding motor 370 (e.g., the sliding motor 270 of FIG. 2A) to change a display area of the display 220.

Referring to FIG. 3A, when a user touches an icon 310 related to an application, an execution process of the application related to the touched icon 310 may be started. Information 320 related to the corresponding application may be displayed on the display 220 according to the execution process of the application.

Referring to FIG. 3B, according to various embodiments, in an application execution process, the processor 350 may acquire first information 301 from the application 340. Here, the first information 301 may include information related to the application 340. For example, the information related to the application 340 may include a display ratio, a width and height, and/or dots per inch (DPI) information of visual information related to the application or content. For example, in the case that the electronic device 200 is an android system, the application 340 may transfer first information 301 to a window manager included in an android framework layer, and the window manager may transfer the first information 301 to the processor 350.

According to various embodiments, the processor 350 may acquire second information 302 from the display 220. The second information 302 acquired by the processor 350 from the display 220 may include an aspect ratio according to an information display area of the display 220 currently being displayed. The processor 350 may acquire second information 302 including current aspect ratio information from a driver (e.g., display driver integrated circuit (IC)) or a kernel of the display 220. According to an embodiment, the processor 350 may acquire second information 302 through a sensor unit (e.g., the sensor unit 240 of FIG. 2A). As described above with reference to FIG. 2A, a distance sensor included in the sensor unit may measure the degree of expansion of the second housing 213 with respect to the first housing 211. The processor 350 may determine an aspect ratio according to an information display area of the display 220 through the degree of extension of the second housing 213 with respect to the first housing 211. FIG. 3B illustrates that the processor 350 acquires the first information 301 and the second information 302, but the order of acquiring the first information 301 and the second information 302 may be changed. In some cases, the processor 350 may substantially simultaneously acquire the first information 301 and the second information 302.

According to various embodiments, the processor 350 may compare the first information 301 and the second information 302, at operation 309. The processor 350 may transmit a control signal (or control command) 303 to the sliding motor 370 based on the comparison result of operation 309. For example, the processor 350 may compare a display ratio of information included in the first information 301 and an aspect ratio included in the second information 302. The processor 350 may transmit the control command 303 to the sliding motor 370 to slide the second housing 213. When the second housing 213 slides, the display 220 may also slide, and the information display area of the display 220 may change. The processor 350 may vary the information display area of the display 220 so that information related to the application 340 may be optimally displayed on the display 220.

For example, in the case that the display ratio (e.g., first information 301) of information related to the application 340 and the aspect ratio (e.g., second information 302) of the display 220 are different, when information related to the application 340 is displayed on the display 220 while maintaining the display ratio of information related to the application 340, a letter box may be displayed below and above the displayed information related to the application 340. According to an embodiment, the letter box may denote displaying a difference between the display ratio of the application 340 and the aspect ratio of the display 220 in the form of a black band on the display 220 as one of methods of matching the aspect ratio when displaying an application or content having a display ratio different from that of the display 220. In the case of displaying information such that the letter box is minimized, a problem that a ratio of information related to the application 340 is changed or a part of the information related to the application 340 is cut off may occur. The processor 350 may control the sliding motor 370 to slide the display 220, thereby changing the information display area of the display 220. When the information display area is changed, the aspect ratio of the display 220 may also be changed. In the case that the aspect ratio of the display 220 is the same as or most similar to the display ratio of information related to the application 340, the area of the above-described letter box may be minimized. The processor 350 may compare, at operation 309, the first information 301 and the second information 302 to control, via the control command 303, the sliding motor 370 so that the aspect ratio of the currently displayed display 220 is the same as or most similar to the display ratio of the information related to the application 340. In this way, by maximally matching the display ratio of the application 340 related information with the aspect ratio of the display 220, the application 340 related information may be used in an optimal ratio.

For example, in the case that a display ratio related to the application 340 is 16:9 and the display aspect ratio is 2400×1080, the aspect ratio of the display 220 may be adjusted to 1920×1080. In this case, the processor 350 may transmit a control signal or control command to the sliding motor 370 so that a screen is reduced by 480 pixels, which is the difference in horizontal resolution. By an operation of the sliding motor 370, the second housing 213 may slide with respect to the first housing 211, and an aspect ratio of the display 220 may be adjusted to 1920×1080.

According to various embodiments, the processor 350 may process information such that information displayed on the display 220 is continuously output while the information display area of the display 220 is changed. Referring to FIG. 3C, the information display area of the display 220 may be continuously changed. The processor 350 may continuously change a display size 330 of application information to correspond to the continuous change of the information display area. With reference to FIG. 3C, the display size 330 of application information may be continuously changed (e.g., 330-1, 330-2, and/or 330-3 of FIG. 3C) according to a change in the information display area of the display 220 (e.g., 220-1, 220-2, and/or 220-3 of FIG. 3C). For example, the processor 350 may continuously change the display size 330 of the application information to correspond to a change speed of the information display area according to the sliding speed of the display 220. As a result, the display size 330 of the application information may be naturally changed according to the information display area of the display 220. The processor 350 may continue to provide application information while the display 220 is sliding. Further, as the display size 330 of the application information is naturally changed according to the change in the information display area of the display 220, it is possible to provide visual satisfaction to the user.

According to various embodiments, a change in the information display area of the display 220 according to driving of the sliding motor 370 may be performed according to a user's designated input.

According to an embodiment, the processor 350 may identify whether a user's touch input through the display 220 satisfies a specified condition. According to an embodiment, when a user's touch input satisfies a specified condition, the processor 350 may drive the sliding motor 370 to change the information display area of the display 220. For example, in the case that the user touches an icon (e.g., the icon 310 of FIG. 3A) related to an application in a drag and drop method, the processor 350 may acquire and compare the first information 301 and the second information 302 to drive the sliding motor 370. For another example, in the case that a touch gesture stored in a memory (e.g., the memory 130 of FIG. 1) matches a touch gesture input by the user, the processor 350 may drive the sliding motor 370. Here, the touch gesture may include an input composed of a set of continuous changes in touch input coordinates.

Figure 4:
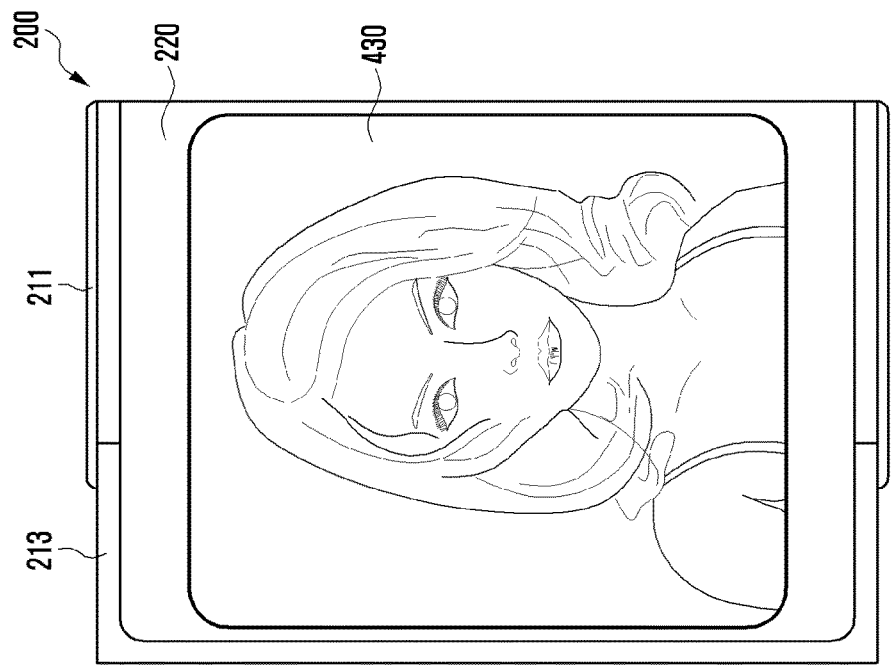
FIG. 4 is a diagram illustrating an operation according to execution of an application related to a video call in an electronic device according to an embodiment of the disclosure.
Figure 4:
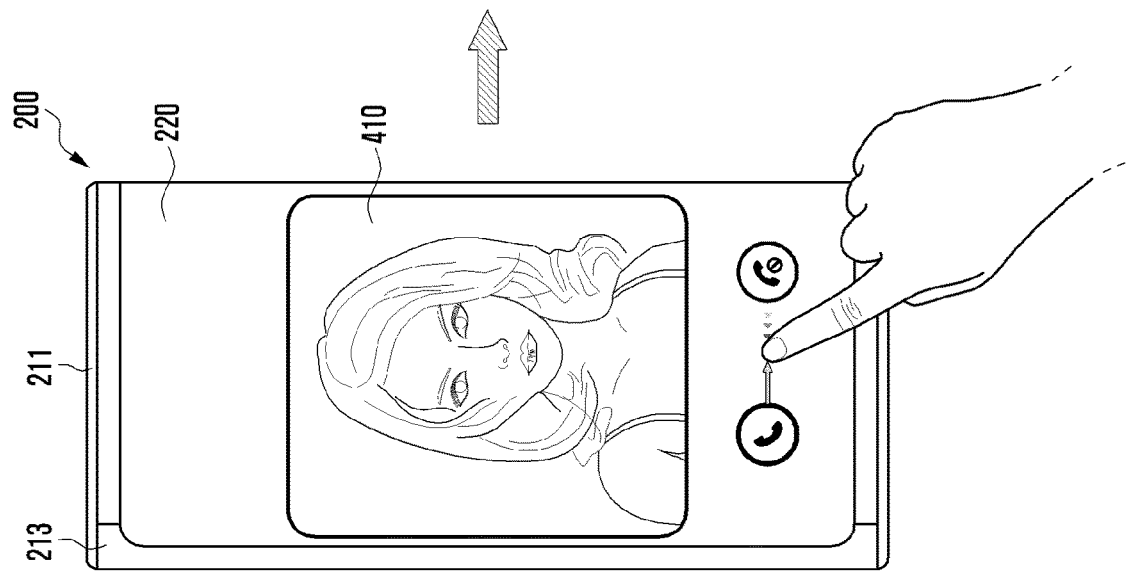

FIG. 4 is a diagram illustrating an operation according to execution of an application related to a video call in an electronic device according to an embodiment of the disclosure.

According to various embodiments, a processor (e.g., the processor 120 of FIG. 1 or the processor 250 of FIG. 2A) of the electronic device 200 (e.g., the electronic device 101 of FIG. 1) may execute a video call related application.

According to various embodiments, the processor may display a caller's image on a display (e.g., the display 220 of FIGS. 2A to 2C) at an optimal aspect ratio when executing a video call related application. Referring to FIG. 4, the display 220 may be slid so that a caller's streaming image 430 is more efficiently displayed on the display 220 than a caller's image 410 before sliding.

Because the flow of changing the information display area of the display 220 according to the execution of the video call related application is similar to the message flow diagram illustrated in FIG. 3B, it will be described with reference to FIG. 3B. According to various embodiments, the processor 350 may acquire first information from the application 340. For example, the application 340 may include a video call related application. The first information 301 may be streaming image information provided by a caller received through a communication module (e.g., the communication module 190 of FIG. 1) of the electronic device. The first information 301 may include, for example, an image size, an image compression rate, and/or an image frame rate.

According to various embodiments, the processor 350 may acquire second information 302 from the display 220. The second information 302 acquired by the processor 350 from the display 220 may include an aspect ratio according to an information display area of the display 220 currently being displayed. The processor 350 may acquire second information 302 including currently displayed aspect ratio information from a driver or kernel of the display 220.

According to various embodiments, the processor 350 may compare the first information 301 and the second information 302, at operation 309. The processor 350 may transmit a control signal (or control command) 303 to the sliding motor 370 based on the comparison result. For example, the processor 350 may compare the display ratio of the information included in the first information 301 and the aspect ratio included in the second information 302, at operation 309. The processor 350 may transmit a control signal (or control command) 303 to the sliding motor 370 to slide the second housing (e.g., the second housing 213 of FIG. 2A). When the second housing 213 slides, the display 220 may also slide, and the information display area of the display 220 may change. The processor 350 may vary the information display area of the display 220 so that application related information may be optimally displayed on the display 220.

Figure 5A:
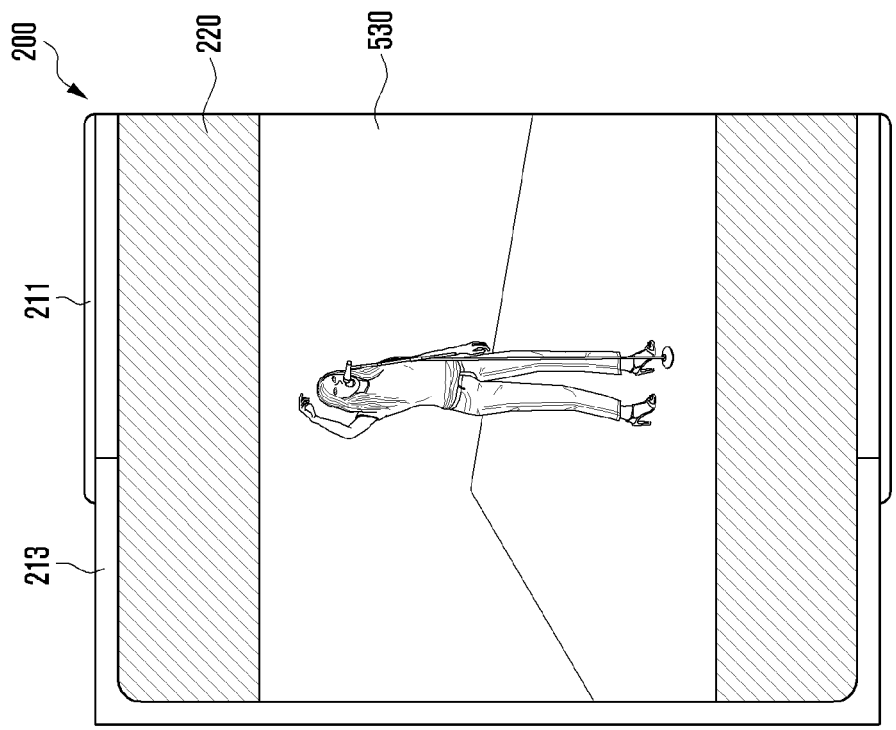
FIGS. 5A and 5B are diagrams illustrating operations according to execution of a media playback application of an electronic device according to various embodiments of the disclosure.
Figure 5A:
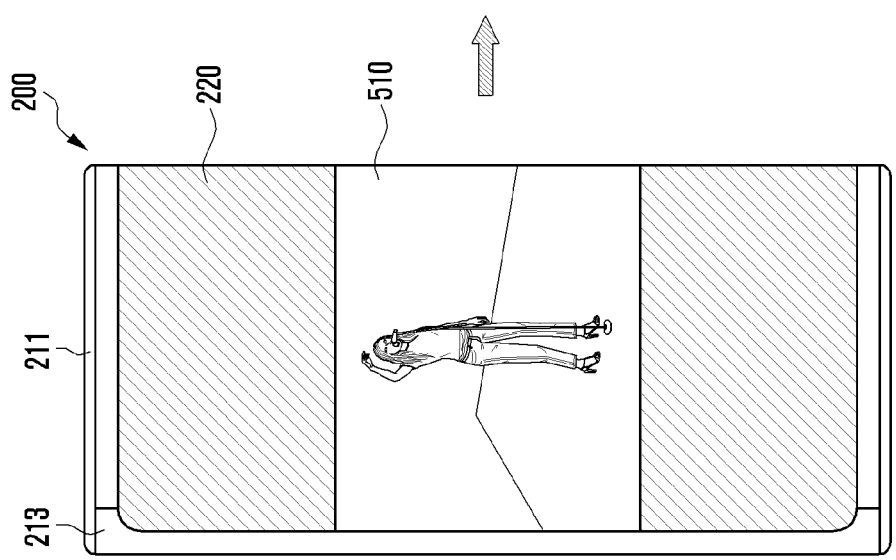
Figure 5B:
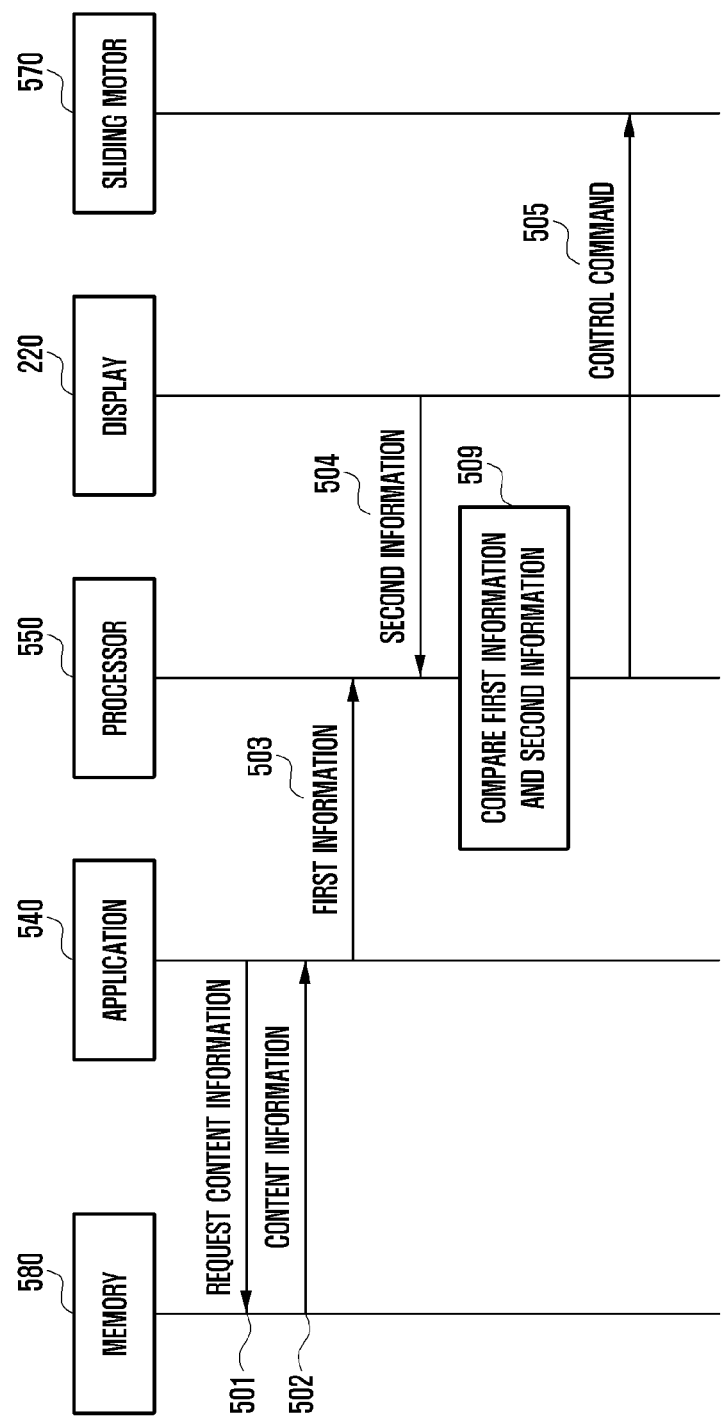

FIGS. 5A and 5B are diagrams illustrating operations according to execution of a media playback application of an electronic device according to various embodiments of the disclosure.

According to various embodiments, a processor 550 (e.g., the processor 120 of FIG. 1 or the processor 250 of FIG. 2A) of the electronic device 200 (e.g., the electronic device 101 of FIG. 1) may execute an application 540.

According to various embodiments, the processor 550 (e.g., the processor 120 of FIG. 1 or the processor 250 of FIG. 2A) may change the information display area of the display 220 so that media (e.g., video, photo, and the like) played when a media playback application is executed may be displayed in an optimized ratio. Referring to FIG. 5A, a first display area of media 510 compared to an information display area of the display 220 may increase to a second display area of media 530 after sliding than before sliding.

Referring to FIG. 5B, according to various embodiments, the processor 550 may acquire first information 503 from the application 540. For example, the application 540 may include a media playback application. The application 540 may access a content stored in a memory 580 (e.g., the memory 130 of FIG. 1) of the electronic device 200 to acquire information related to the content, and transfer the information to the processor 550. For example, the application 540 may request, at operation 501, content information to the memory 580, and the memory 580 may transfer content information, at operation 502, to the application 540. Here, the content information may be information including information included in first information 503. The first information 503 transferred by the application 540 to the processor 550 may include a format, size, and/or resolution of the content. According to an embodiment, when a specific content is played in the media playback application 540, the processor 550 may directly acquire the first information 503 from the specified content stored in the memory 580.

According to various embodiments, the processor 550 may acquire second information 504 from the display 220. The second information 504 acquired by the processor 550 from the display 220 may include an aspect ratio according to an information display area of the currently displayed display 220. The processor 550 may acquire second information 504 including current aspect ratio information from a driver or kernel of the display 220.

According to various embodiments, the processor 550 may compare the first information 503 and the second information 504, at operation 509. The processor 550 may transmit a control signal (or control command) 505 to a sliding motor 570 based on the comparison result. For example, the processor 550 may compare a display ratio of the content included in the first information 503 and an aspect ratio included in the second information 504, at operation 509. The processor 550 may transmit the control signal (or control command) 505 to the sliding motor 570 to slide the second housing 213. When the second housing 213 slides, the display 220 may also slide, and an information display area of the display 220 may change. The processor 550 may vary the information display area of the display 220 so that a content related to the application 540 may be optimally displayed on the display 220.

According to various embodiments, the processor 550 may control the sliding motor 570 using the size of media to be played in a media playback application. In the case of playing a plurality of media, sizes and ratios of the media to be played may be different. The processor 550 may compare sizes of media to be played to group media having the same ratio. The processor 550 may continuously display media having the same display ratio on the display 220. By continuously displaying media having the same display ratio, the number of times of changing the information display area of the display 220 may be minimized. In some cases, in the case that it is necessary to change the information display area beyond a configured criterion due to different display ratios of media to be played, the processor 550 may not drive the sliding motor 570. Further, even in the case that the display ratio difference of the media to be played is lower than a configured criterion, the processor 550 may not drive the sliding motor 570.

Figure 6:
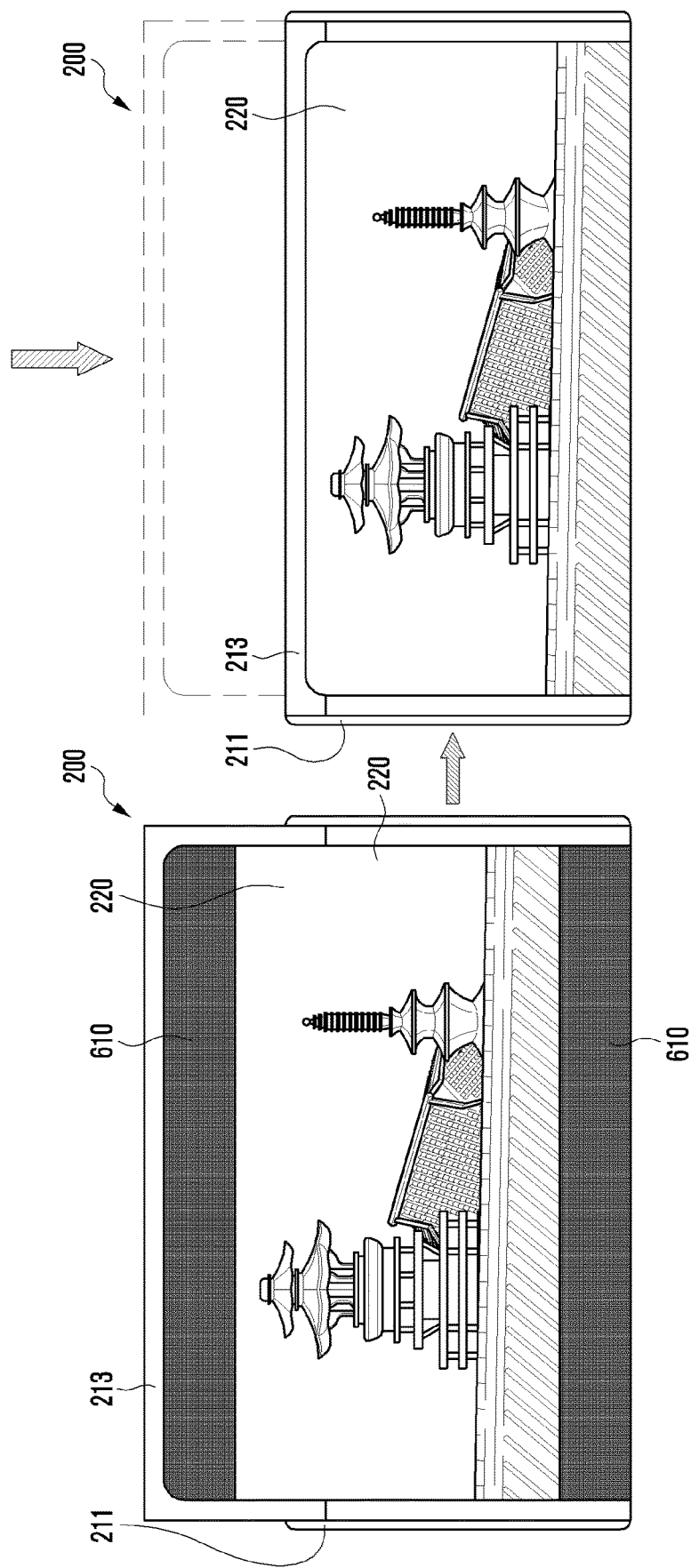
FIGS. 6 and 7 are diagrams illustrating a method of controlling a display included in an electronic device according to various embodiments of the disclosure.

FIG. 6 is a diagram illustrating a method of controlling a display included in an electronic device according to an embodiment of the disclosure.

Referring to FIG. 6, according to various embodiments, the processor (e.g., the processor 120 of FIG. 1 or the processor 250 of FIG. 2A) may drive a sliding motor (e.g., the sliding motor 270 of FIG. 2A) according to the size of a letter box 610 displayed on the display 220. The letter box 610 may denote a black area generated when information is displayed on the display 220 in an original display ratio thereof in the case that an aspect ratio of the display 220 and a display ratio of information to be displayed on the display 220 are different. When information is displayed on the display 220 at an original information display ratio, there may be an area in which information is not displayed on the display 220, and this area may be generally blacked out.

According to various embodiments, in the case that an area of the letter box 610 displayed on a portion adjacent to an edge of the display 220 satisfies a predetermined criterion, the processor may drive the sliding motor to change the information display area of the display 220. For example, in the case that an area of the letter box 610 is 30% of the information display area of the display 220, the processor may change the information display area of the display 220. A criterion for changing the information display area of the display 220 may be variously changed. In the case that the difference between the display ratio of information and the aspect ratio of the display 220 is greater than in the case that the difference between the display ratio of information currently being displayed on the display 220 and the aspect ratio of the display 220 is small, an area of the letter box 610 may be larger than the information display area of the display 220. The processor may change the information display area of the display 220 so that the area of the letter box 610 becomes smaller.

According to various embodiments, as described with reference to FIG. 3C, the processor may process the content such that the content displayed on the display 220 is continuously output while the information display area of the display 220 is changed. The information display area of the display 220 may be continuously changed until it reaches a target value. The processor may change the display size of the application content to correspond to the continuous change of the information display area. For example, the processor may continuously change the display size of the content to correspond to a change speed of the information display area according to a sliding speed of the display 220. As a result, the display size of the content may be naturally changed according to the information display area of the display 220. The user may continue to use the content while the display 220 is sliding. Further, as the display size of the content is naturally changed and provided according to the change in the information display area of the display 220, it is possible to provide visual satisfaction to the user.

Figure 7:
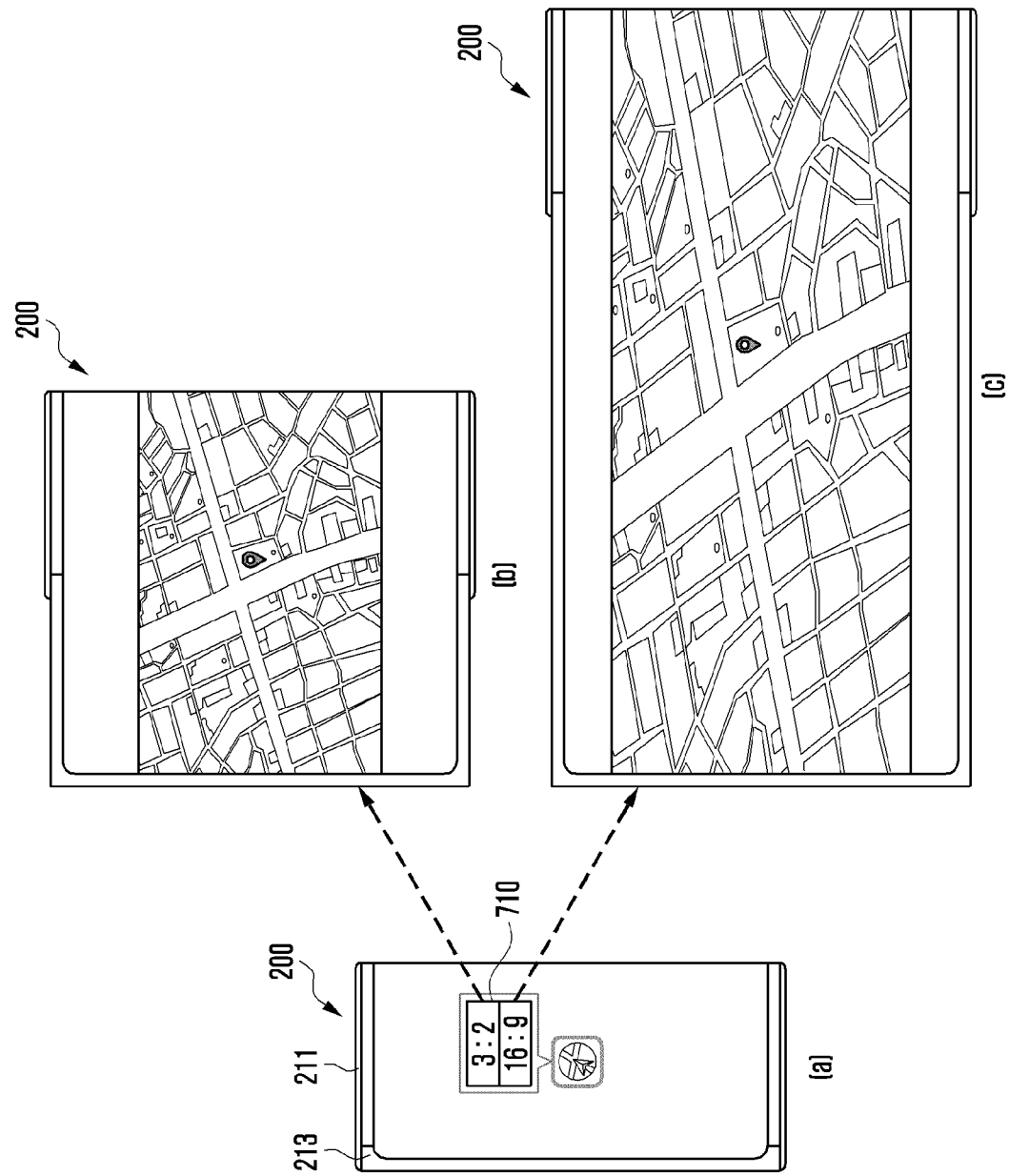

FIG. 7 is a diagram illustrating a method of controlling a display included in an electronic device according to an embodiment of the disclosure.

According to various embodiments, the processor (e.g., the processor 120 of FIG. 1 or the processor 250 of FIG. 2A) may display application information at a plurality of display ratios in the case of a designated application. For example, a camera photographing related application may support photographing with various photo ratios (e.g., 1:1, 4:3, or 16:9). In this case, the information display area of the display 220 may be changed according to the user's selection. Referring to part (a) of FIG. 7, when the application is executed, the processor may control to display application information 710 in a plurality of display ratios supported by the application on the display 220. The processor may control the sliding motor according to a display ratio selected by the user. For example, in the case that the user selects a ratio 3:2 as the application display ratio, the processor may control the sliding motor so that the aspect ratio of the display 220 becomes 3:2, referring to part (b) of FIG. 7, and in the case that the user selects a ratio 16:9 as the application display ratio, the processor may control the sliding motor so that the aspect ratio of the display 220 becomes 16:9, referring to part (c) of FIG. 7.

Figure 8A:
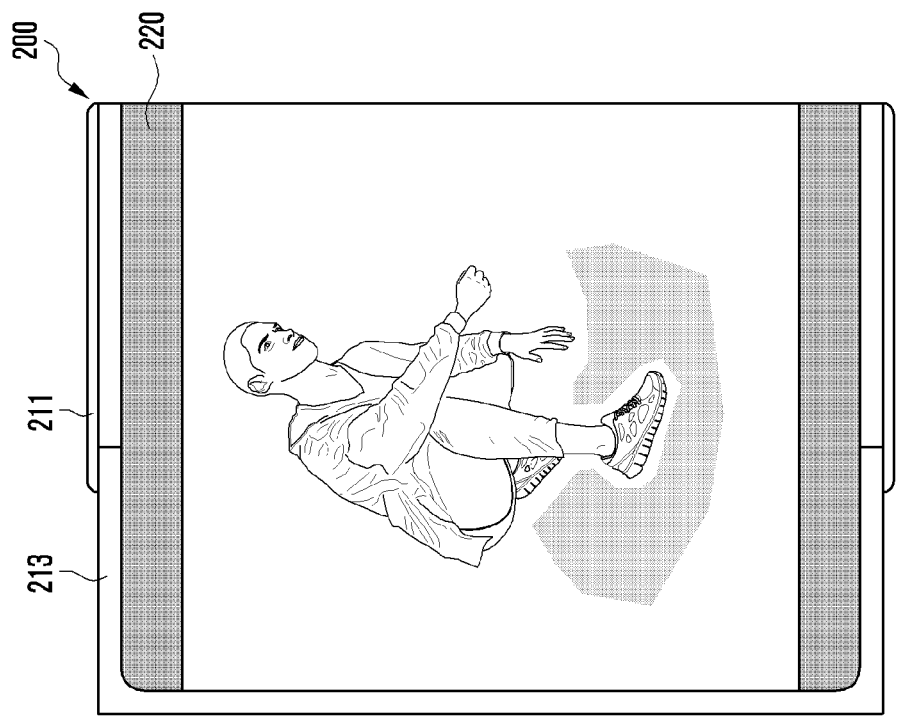
FIGS. 8A and 8B are diagrams illustrating an interface display for manually changing an information display area of a display included in an electronic device according to various embodiments of the disclosure.
Figure 8A:
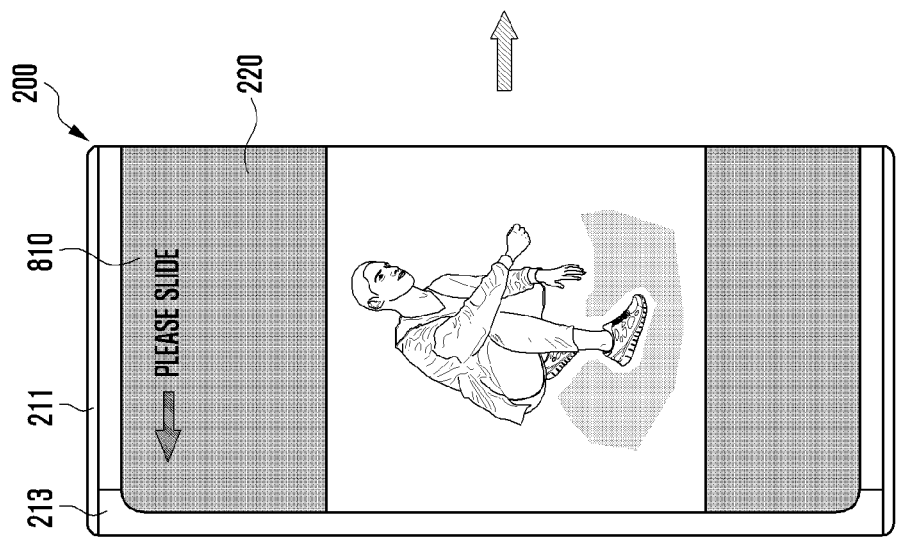
Figure 8B:
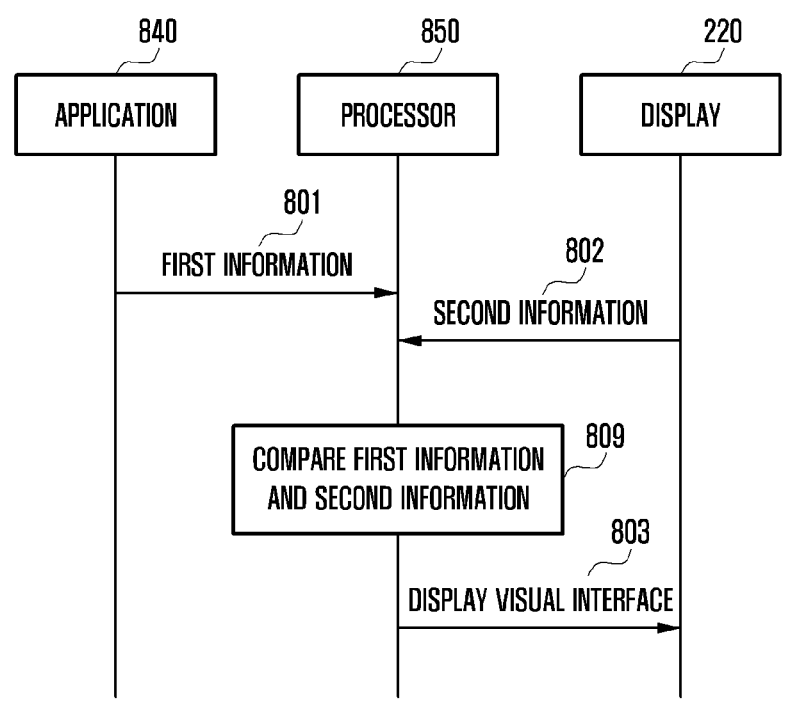

FIGS. 8A and 8B are diagrams illustrating an interface display for manually changing an information display area of a display included in an electronic device according to various embodiments of the disclosure.

According to various embodiments, the change in the information display area of the display 220 may be performed not by driving a sliding motor (e.g., the sliding motor 270 of FIG. 2A) but by an external force by a user. For example, the user may change the information display area of the display 220 by holding the second housing 213 coupled to the display 220 and sliding the second housing 213 with respect to the first housing 211. Referring to FIG. 8A, a processor 850 (e.g., the processor 120 of FIG. 1 or the processor 250 of FIG. 2A) may induce a user to slide the display 220 through a visual interface 810 displayed on the display 220.

Referring to FIG. 8B, according to various embodiments, the processor 850 may acquire first information 801 from an application 840 in an execution process of the application 840. According to an embodiment, the first information 801 may include application 840 related information. According to an embodiment, the application 840 related information may include a display ratio, a width and height, and/or dots per inch (DPI) thereof. For example, in the case that the electronic device 200 (e.g., the electronic device 101 of FIG. 1) is an android system, the application 840 may transfer the first information 801 to a window manager included in an android framework layer, and the window manager may transfer the first information 801 to the processor 850.

According to various embodiments, the processor 850 may acquire second information 802 from the display 220. The second information 802 acquired by the processor 850 from the display 220 may include an aspect ratio according to an information display area of the current display 220. The processor 850 may acquire second information 802 including current aspect ratio information from a driver or kernel of the display 220.

According to various embodiments, the processor 850 may compare the first information 801 and the second information 802, at operation 809. The processor 850 may display the visual interface 810 on the display 220 based on the comparison result, at operation 803. The visual interface 810 displayed on the display 220 may be a display that induces a user to change an information display area of the display 220. For example, as illustrated in FIG. 8A, the visual interface 810 may include an arrow indicating a sliding direction of the display 220 and a phrase inducing to slide the display 220. The user may slide the display 220 according to the visual interface 810 displayed on the display 220. In the case that the information display area of the display 220 reaches a target value, the processor 850 may display a visual interface notifying completion on the display 220 or may remove the displayed visual interface 810.

According to various embodiments disclosed in this document, an electronic device may include a first housing; a second housing slidably installed with respect to the first housing; a display having one end fixed to the second housing and having a variable information display area, which is an area in which information may be visually displayed according to sliding of the second housing; a sliding motor driven to slide the second housing with respect to the first housing; and a processor operatively connected with the display and the sliding motor, wherein the processor may be configured to acquire first information including a display ratio of application related information to be displayed on the display by execution of the application when the application is executed, to acquire second information including an aspect ratio according to an information display area of the display, to compare the first information and the second information, and to control the sliding motor based on the comparison result.

Further, the processor may be configured to control the sliding motor so that the aspect ratio included in the second information matches the display ratio included in the first information based on the comparison result.

Further, the processor may be configured to process the information so that the application related information displayed on the display is continuously output while the sliding motor is driven.

Further, the processor may be configured to enlarge or reduce the application related information displayed on the display or to adjust a size of the application related information so that the application related information displayed on the display is continuously output.

Further, the processor may be configured to acquire the first information and to compare the first information and the second information based on the user's input through the display to operate the sliding motor.

Further, the user's input may include a drag and drop input of the application icon.

According to various embodiments disclosed in this document, an electronic device may include a first housing; a second housing slidably installed with respect to the first housing; a display having one end fixed to the second housing and having a variable information display area according to sliding of the second housing; a sliding motor driven to slide the second housing with respect to the first housing; and a processor operatively connected with the display and the sliding motor, wherein the processor may be configured to identify whether an area of a letter box displayed in a portion adjacent to an edge of the display satisfies a preconfigured criterion, and to control the sliding motor based on the identification result.

Further, the processor may be configured to process application related information so that the application related information displayed on the display is continuously output while the sliding motor is driven.

Further, the processor may be configured to enlarge or reduce the application related information displayed on the display or to adjust a size of the application related information so that the information displayed on the display is continuously output.

Further, the processor may be configured to control the sliding motor to reduce an area of the letter box by adjusting an aspect ratio of the display based on the identification result.

According to various embodiments disclosed in this document, an electronic device may include a first housing; a second housing slidably installed with respect to the first housing; a display having one end fixed to the second housing and having a variable information display area according to sliding of the second housing; and a processor operatively connected with the display, wherein the processor may be configured to acquire first information including a display ratio of application related information to be displayed on the display by execution of the application when the application is executed, to acquire second information including an aspect ratio according to an information display area of the display, which is an area in which information may be visually displayed, to compare the first information and the second information, and to display a visual interface that induces a user to slide the display on the display based on the comparison result.

According to various embodiments disclosed in this document, a method of controlling a display of an electronic device may include acquiring, by a processor, first information including a display ratio of application related information to be displayed on the display by execution of the application, when the application is executed; acquiring, by the processor, second information including an aspect ratio according to an information display area of the display, which is an area in which information may be visually displayed; comparing, by the processor, the first information and the second information; and controlling, by the processor, a sliding motor to change an information display area of the display based on the comparison result.

Further, controlling, by the processor, the sliding motor may include controlling the sliding motor so that the aspect ratio included in the second information matches the display ratio included in the first information.

Further, the method may further include processing, by the processor, the application related information so that application related information displayed on the display is continuously output while the sliding motor is driven.

Further, processing the application related information may include enlarging or reducing the application related information displayed on the display or adjusting a size of the application related information so that the application related information displayed on the display is continuously output.

According to various embodiments disclosed in this document, a method of controlling a display of an electronic device may include acquiring, by a processor, an area of a letter box displayed on a portion adjacent to an edge of the display, identifying, by the processor, whether the area of the letter box satisfies a preconfigured criterion, and controlling, by the processor, a sliding motor to change an information display area of the display, which is an area in which information may be visually displayed based on the identification result.

Further, the method may further include processing, by the processor, the application related information so that application related information displayed on the display is continuously output while the sliding motor is driven.

Further, processing the application related information may be enlarging or reducing the application related information displayed on the display or adjusting the size of the application related information so that the application related information displayed on the display is continuously output.

Further, controlling, by the processor, the sliding motor may be reducing an area of the letter box by adjusting an aspect ratio of the display based on the identification result.

According to various embodiments disclosed in this document, a method of controlling a display of an electronic device may include acquiring, by a processor, first information including a display ratio of application related information to be displayed on the display by execution of the application, when the application is executed; acquiring, by the processor, second information including an aspect ratio according to an information display area of the display, which is an area in which information may be visually displayed; comparing, by the processor, the first information and the second information; and displaying, by the processor, a visual interface that induces a user to slide the display on the display based on the comparison result.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing slidably coupled with the first housing;

a display having one end fixed to the second housing and having a variable information display area, the variable information display area being an area in which information is visually displayed according to a sliding of the second housing;

a sliding motor configured to be driven to slide the second housing with respect to the first housing; and a processor operatively connected to the display and the sliding motor, wherein the processor is configured to:

in response to receiving a command to execute an application, acquire first information including a display ratio of an execution screen of the application or content of the application to be displayed on the display while executing the application, acquire second information including an aspect ratio according to an information display area of the display, the information display area being an area in which information is visually displayed, compare the first information and the second information, and based on a result of the comparing of the first information and the second information, control the sliding motor to move the second housing to change a size of the information display area of the display.

2. The electronic device of claim 1, wherein the processor is further configured to:

based on the result of the comparing of the first information and the second information, control the sliding motor such that the aspect ratio in the second information matches the display ratio in the first information.

3. The electronic device of claim 1, wherein the processor is further configured to:

process the execution screen of the application or the content of the application being visually displayed so that the execution screen of the application or the content of the application being displayed on the display is continuously output while the sliding motor is being driven.

4. The electronic device of claim 3, wherein the processor is further configured to:

enlarge or reduce the execution screen of the application or the content of the application being displayed on the display or adjust a size of the execution screen of the application or the content of the application so that the execution screen of the application or the content of the application being displayed on the display is continuously output.

5. The electronic device of claim 1, wherein the processor is further configured to:

based on a user's input being received through the display to operate the sliding motor, acquire the first information and compare the first information and the second information.

6. The electronic device of claim 5, wherein the user's input comprises a drag and drop input of an icon of the application.

7. The electronic device of claim 1, wherein the processor is further configured to:
   identify whether an area of a letter box displayed in a portion adjacent to an edge of the display satisfies a preconfigured criterion; and
   based on a result of the identifying, control the sliding motor.

8. The electronic device of claim 7, wherein the processor is further configured to:
   process the execution screen of the application or the content of the application so that the execution screen of the application or the content of the application being displayed on the display is continuously output while the sliding motor is driven.

9. The electronic device of claim 8, wherein the processor is further configured to:
   enlarge or reduce the execution screen of the application or the content of the application being displayed on the display or adjust a size of the execution screen of the application or the content of the application so that the information being visually displayed on the display is continuously output.

10. The electronic device of claim 7, wherein the processor is further configured to:
    based on the result of the identifying, control the sliding motor to reduce an area of the letter box by adjusting the aspect ratio of the display.

11. A method of controlling a display performed by an electronic device for the electronic device, the method comprising:
    in response to receiving a command to execute an application, acquiring, by the electronic device, first information including a display ratio of an execution screen of the application or content of the application to be displayed on the display while executing the application;
    acquiring, by the electronic device, second information including an aspect ratio according to an information display area of the display, the information display area being an area in which information is visually displayed;
    comparing, by the electronic device, the first information and the second information; and
    based on a result of the comparing of the first information and the second information, controlling, by the electronic device, a sliding motor of the electronic device to move a second housing of the electronic device coupled to a first housing of the electronic device to change a size of the information display area of the display such that the aspect ratio, which is in the second information, matches the display ratio in the first information.

12. The method of claim 11, further comprising:
    processing, by the electronic device, the execution screen of the application or the content of the application so that the execution screen of the application or the content of the application being displayed on the display is continuously output while the sliding motor is being driven.

13. The method of claim 12, wherein the processing of the execution screen of the application or the content of the application comprises enlarging or reducing the execution screen of the application or the content of the application being displayed on the display or adjusting a size of the execution screen of the application or the content of the application so the execution screen of the application or the content of the application being displayed on the display is continuously output.

14. A method performed by an electronic device for controlling a display of the electronic device, the method comprising:
    in response to receiving a command to execute an application, acquiring, by the electronic device, first information including a display ratio of an execution screen of the application or content of the application to be displayed on the display while executing the application;
    acquiring, by the electronic device, second information including an aspect ratio according to an information display area of the display, the information display area being an area in which information is visually displayed;
    comparing, by the electronic device, the first information and the second information; and
    based on a result of the comparing of the first information and the second information, displaying, by the electronic device, a visual interface together with the execution screen of the application or the content of the application,
    wherein the visual interface induces a user to slide the display.

* * * * *